United States Patent
Yilmaz et al.

(10) Patent No.: US 11,294,527 B2
(45) Date of Patent: Apr. 5, 2022

(54) INTERDIGITATABLE ELECTRODE FOR TOUCH PANEL, TOUCH PANEL INCLUDING THE SAME, AND TERMINAL DEVICE WITH TOUCH PANEL

(71) Applicant: FlexTouch Technologies Co., Ltd., JiaXing (CN)

(72) Inventors: Esat Yilmaz, Santa Cruz, CA (US); Jonathan Jianguo Jiang, Saratoga, CA (US)

(73) Assignee: FLEXTOUCH TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 16/885,238

(22) Filed: May 27, 2020

(65) Prior Publication Data

US 2021/0349576 A1  Nov. 11, 2021

(30) Foreign Application Priority Data

May 8, 2020 (CN) .......................... 202010390217.3

(51) Int. Cl.
*G06F 3/044* (2006.01)
*G06F 3/041* (2006.01)

(52) U.S. Cl.
CPC .......... *G06F 3/0448* (2019.05); *G06F 3/0445* (2019.05); *G06F 3/04144* (2019.05)

(58) Field of Classification Search
CPC .. G06F 3/04144; G06F 3/0445; G06F 3/0448; G06F 2203/04103; G06F 2203/04112; G09G 2300/0421
See application file for complete search history.

(56) References Cited

U.S. PATENT DOCUMENTS

| | | | | |
|---|---|---|---|---|
| 8,134,541 B2* | 3/2012 | Chen | .................... | G06F 3/0445 345/174 |
| 2005/0270273 A1* | 12/2005 | Marten | ................. | G06F 3/0445 345/173 |
| 2011/0025639 A1* | 2/2011 | Trend | .................... | G06F 3/0445 345/174 |
| 2012/0062472 A1* | 3/2012 | Yilmaz | .................. | G06F 3/041 345/173 |
| 2013/0088459 A1* | 4/2013 | Yeh | ........................ | G06F 3/0446 345/174 |
| 2013/0154991 A1* | 6/2013 | Yilmaz | ................. | G06F 3/0445 345/174 |
| 2014/0054156 A1 | 2/2014 | Chang et al. | | |

(Continued)

FOREIGN PATENT DOCUMENTS

CN     103631432 A    3/2014

OTHER PUBLICATIONS

Office Action dated 2021 in CN Application No. 202010390217.3.

(Continued)

*Primary Examiner* — Mihir K Rayan
(74) *Attorney, Agent, or Firm* — Panitch Schwarze Belisario & Nadel LLP

(57) ABSTRACT

Disclosed is an interdigitatable electrode for a touch panel, a touch panel including the same, and a terminal device with the touch panel, the electrode including a plurality of arms, each of at least one of which further includes at least one digit extending therefrom. A significantly improved accuracy performance of touch sensing would be expected.

15 Claims, 3 Drawing Sheets

(56) References Cited

U.S. PATENT DOCUMENTS

2014/0292703 A1* 10/2014 Yilmaz ................. G06F 3/0448
                                                          345/174
2015/0370363 A1* 12/2015 Trend ................... G06F 3/0443
                                                          345/174
2017/0277305 A1*  9/2017 Pu ....................... G06F 3/04164
2019/0294274 A1*  9/2019 Cho ..................... G06F 3/0416

OTHER PUBLICATIONS

Search Report dated 2021 in CN Application No. 202010390217.3.
Office Action dated Oct. 14, 2021 in CN Application No. 202010390217.3.

\* cited by examiner

INTERDIGITATABLE ELECTRODE FOR TOUCH PANEL, TOUCH PANEL INCLUDING THE SAME, AND TERMINAL DEVICE WITH TOUCH PANEL

CROSS-REFERENCE TO RELATED APPLICATION

This application claims priority under 35 U.S.C. § 119(b) to Chinese Application No. 202010390217.3, filed May 8, 2020, the disclosure of which is incorporated herein by reference in its entirety.

BACKGROUND OF THE INVENTION

The present disclosure generally relates to touch sensing, in particular to an improved interdigitatable electrode for a touch panel, a touch panel including the same, and a terminal device with the touch panel.

A touch sensor may detect the presence and location of a touch or the proximity of an object (such as a user's finger or a stylus) within a touch-sensitive area of the touch sensor overlaid on another functional component, such as a display screen of a display device or a force sensor of a trackpad, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable devices. A control panel on a household or other appliance may include a touch sensor.

There are a number of different types of touch sensors, for example, resistive touch panels, surface acoustic wave touch panels, and capacitive touch panels. Herein, reference to a touch sensor may encompass a touch panel, and vice versa, where appropriate. When an object touches or comes within proximity of the surface of the capacitive touch panel, a change in capacitance may occur within the touch panel at the location of the touch or proximity. A touch-sensor controller may process the change in capacitance to determine its position on the touch panel.

BRIEF SUMMARY OF THE INVENTION

The present disclosure aims to provide an interdigitatable electrode for a touch panel, a touch panel including the same, and a terminal device with the touch panel, which achieves significantly improved accuracy performance in touch sensing.

One aspect of the present disclosure provides an electrode for a touch panel including a plurality of arms, each of at least one of which further includes at least one digit extending therefrom.

Another aspect of the present disclosure provides a touch panel including one or more arrays of electrodes, each of at least one of which includes a plurality of electrodes as described above.

Still another aspect of the present disclosure provides a terminal device including a touch panel as described above.

Other aspects and features of the present disclosure will become apparent, to those ordinarily skilled in the art, upon review of the following description of the specific examples of the specification.

BRIEF DESCRIPTION OF THE SEVERAL VIEWS OF THE DRAWINGS

The figures depict one or more implementations in accordance with the present teachings, by way of example only, not by way of limitation. In the figures, like reference numerals refer to the same or similar elements.

DEAILED DESCRIPTION OF THE INVENTION

Figure 1:
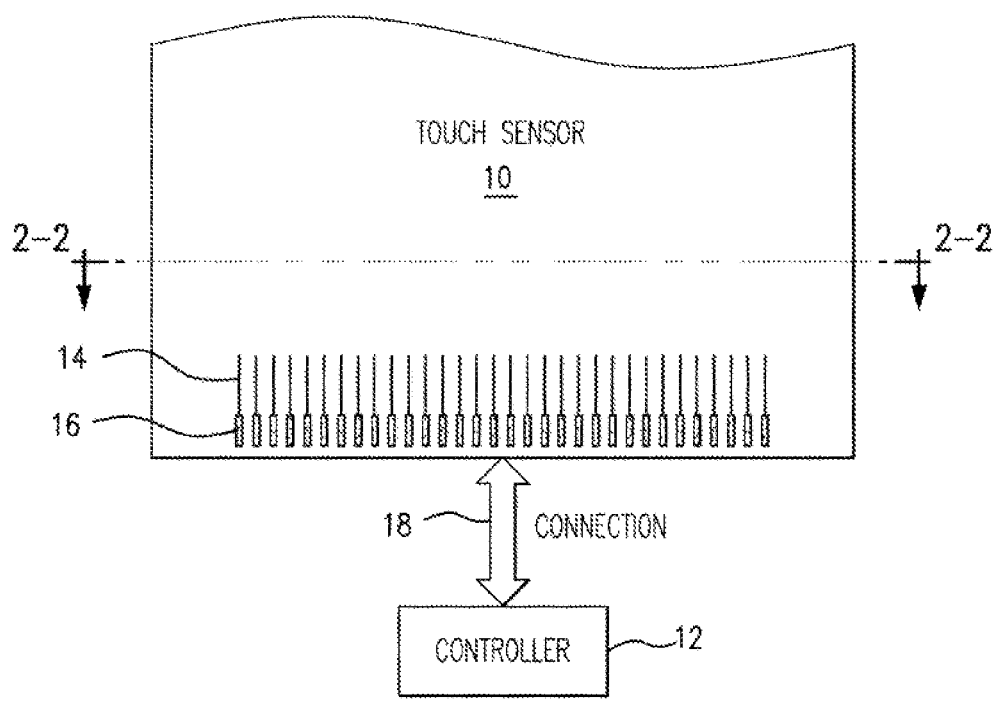
FIG. 1 illustrates a touch sensor and touch sensor controller in accordance with particular embodiments.

FIG. 1 illustrates a touch sensor and touch sensor controller in accordance with particular embodiments. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the controller and its touch sensor, where appropriate. Touch sensor 10 may include one or more touch-sensitive areas, where appropriate. Touch sensor 10 may include an array of drive and sense electrodes (for example, electrodes 102 and 103 in FIG. 2) or an array of electrodes of a single type disposed on one or more substrates, which may be made of a dielectric material. Herein, reference to a touch sensor may encompass both the electrodes of the touch sensor and the substrate(s) that they are disposed on, where appropriate.

Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a circle, square, rectangle, quadrilateral, other suitable shape, or suitable combination of these shapes. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% (such as for example, approximately 5%) of the area of its shape. As an example and not by way of limitation, an electrode may be made of fine lines of metal or other conductive material (such as for example copper, silver, carbon, aluminum, molybdenum, or a copper- or silver-based material) and the fine lines of conductive material may occupy substantially less than 100% (such as for example, approximately 5%) of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more macro-features of a touch sensor may determine one or more characteristics of its functionality. One or more characteristics of the implementation of those shapes (such as, for example, the conductive materials, fills, or patterns within the shapes) may constitute in whole or in part one or more micro-features of the touch sensor. One or more micro-features of the touch sensor may determine one or more optical features of the touch sensor, such as transmittance, haze, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be transparent and made of a resilient material suitable for repeated touching, such as for example glass, polycarbonate, or poly(methyl methacrylate) (PMMA). Alternatively, the cover panel may also be opaque for certain applications, such as trackpads, in which it is desirable to block lower-layer structures from view. In this type of situation, the mechanical stack may include a first layer of optically opaque adhesive instead of optically clear adhesive. As one example, the cover panel may be formed from a transparent material, the lower surface of which is provided with an opaque layer or coating (e.g., of paint or ink). As another example, the cover panel may be formed from an opaque substance (e.g., dark glass or ceramic). This disclosure contemplates any suitable cover panel made of any suitable material. The first layer of adhesive may be disposed between the cover panel and the substrate with the conductive material forming the drive or sense electrodes. The mechanical stack may also include a second layer of optically clear adhesive and a dielectric layer (which may be made of PET or another suitable material, similar to the substrate with the conductive material forming the drive or sense electrodes). The second layer of optically clear adhesive may be disposed between the substrate with the conductive material making up the drive or sense electrodes and the dielectric layer, and the dielectric layer may be disposed between the second layer of optically clear adhesive and an air gap to a display of a device including touch sensor 10 and touch-sensor controller 12. As an alternative, where appropriate, a thin coating of a dielectric material may be applied instead of the second layer of optically clear adhesive and the dielectric layer. Alternatively, for certain applications, such as trackpads, in which it is desirable to block lower-layer structures from view, the mechanical stack may also include a second layer of optically opaque adhesive instead of optically clear adhesive and may not include the dielectric layer, wherein the second layer of optically opaque adhesive may be disposed between the substrate with the conductive material making up the drive or sense electrodes and another functional layer such as a force sensor layer. As an example only and not by way of limitation, the cover panel may have a thickness of approximately 0.4 mm for certain applications such as mobile phones, and 1 mm for other applications such as industrial automation systems; the first layer of optically clear adhesive may have a thickness approximately ranging from 0.05 mm to 0.1 mm; the substrate with the conductive material forming the drive or sense electrodes may have a thickness of approximately 0.05 mm; the second layer of optically clear adhesive may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of optically clear adhesive, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 0.3 µm or less and a width of approximately 4 µm or less. As another example, one or more portions of the conductive material may be silver or silver-based and similarly have a thickness of approximately 1 µm or less and a width of approximately 4 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs)—such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. In particular embodiments, multiple touch-sensor controllers 12 are disposed on the FPC. In some embodiments, the FPC may have no touch-sensor controllers 12 disposed on it. The FPC may couple touch sensor 10 to a touch-sensor controller 12 located elsewhere, such as for example, on a printed circuit board of the device. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10.

Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

In particular embodiments, touch sensor 10 may have a multi-layer configuration, with drive electrodes disposed in a pattern on one side of a substrate and sense electrodes disposed in a pattern on another side of the substrate. In such a configuration, a pair of drive and sense electrodes capacitively couple to each other at the intersection of a drive electrode and sense electrode. In particular embodiments, a multi-layer configuration of drive and sense electrodes may satisfy certain space and/or shape constraints with respect to the construction of touch sensor 10. Particular embodiments and examples of multi-layer configurations of drive and sense electrodes will be discussed further with respect to FIGS. 2 through 5.

Figure 2:
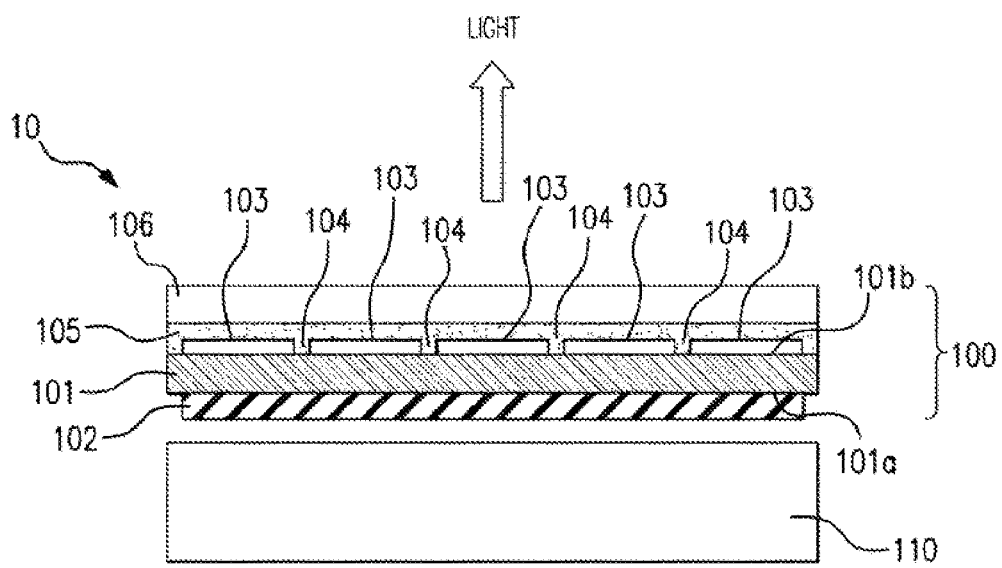
FIG. 2 illustrates a cross section of a touch sensor along the line 2-2 in accordance with particular embodiments.

FIG. 2 illustrates a cross section of touch sensor 10 along lines 2-2 in accordance with particular embodiments. Touch sensor 10 comprises a mechanical stack 100 and a display 110. Mechanical stack 100, which overlays display 110, includes a substrate 101, a drive electrode 102, a plurality of sense electrodes 103, a plurality of gaps 104, an optically clear adhesive 105, and a cover panel 106.

Substrate 101 has a plurality of surfaces, including a first surface 101a facing display 110 and a second surface 101b facing cover panel 106. Substrate 101 may be formed from a transparent, non-conductive material such as glass or a plastic as discussed in conjunction with FIG. 1. Drive electrode 102 is located on first surface 101a of substrate 101, such that drive electrode 102 is located between substrate 101 and display 110. In various embodiments, there may be an air gap between drive electrode 102 and display 110. This cross sectional view provides a view of the length of one drive electrode, drive electrode 102. In a particular embodiment, a plurality of drive electrodes 102 may be located between substrate 101 and display 110, with lengths running generally parallel to drive electrode 102. Each of a plurality of drive electrodes 102 may be separated from one or more adjacent drive electrode by a cut in the conductive material, or a gap. A gap between adjacent drive electrodes may be as narrow as possible to reduce visibility of the cuts. In some embodiments, a gap between drive electrodes may have a width of approximately 15 μm to 5 μm, and in particular embodiments the width may be approximately 13 μm. Drive electrodes may be formed from any suitable material, including conductive mesh and ITO, as discussed in conjunction with FIG. 1.

Sense electrodes 103 are located on second surface 101b of substrate 101, such that sense electrodes 103 are located between substrate 101 and cover panel 106. Each sense electrode 103 is separated from adjacent sense electrodes 103 by gaps 104. Gaps 104 are cuts in the lines of conductive material, such as copper, and may be as narrow as possible. In various embodiments, gaps 104 may have a width of approximately 15 μm to 5 μm, and in particular embodiments the width may be approximately 13 μm. This cross sectional view provides a view of the widths of sense electrodes 103. In certain embodiments, the widths of a touch sensor's sense electrodes may be shorter or longer than sense electrodes 103 as illustrated. In various embodiments, the widths of sense electrodes may be generally the same for all sense electrodes or may vary for each sense electrode 103. Further, in certain embodiments, there may be a greater or fewer number of sense electrodes that illustrated herein. Sense electrodes 103 may be formed from any suitable material, including conductive mesh and ITO, as discussed in conjunction with FIG. 1. Sense electrodes 103 may form patterns that are interpolated. For example, two adjacent sense electrodes 103 may form a pattern in which each electrode has side portions which cover the same stripe-shaped region of a panel, such as a sensing region. Each electrode may cover a portion of the stripe-shaped region, alternating coverage between one electrode and the other along a length of the side regions in an interleaved manner. In some examples, adjacent sense electrodes 103 have side portions that each cover approximately half of the side regions. In certain embodiments, any proportion of the side regions may be encompassed within the electrode.

Although, as illustrated, drive electrode 102 and sense electrodes 103 do not make electrical contact, they may capacitively couple to create capacitive nodes.

Capacitive nodes may be identified based on their location within touch sensor 10. For example, a capacitive node located in a corner of touch sensor 10 may be identified as a corner node, a capacitive node located along an edge of touch sensor 10 may be identified as an edge node, and a capacitive node located away from edges and corners of touch sensor 10 may be identified as a center node.

Cover panel 106 is attached to sense electrodes 103 with optically clear adhesive 105. Cover panel 106 may be clear and made of a resilient material as discussed in conjunction with FIG. 1. As illustrated, light generated by display 110 passes through mechanical stack 100 and is visible to a user of touch sensor 10 through cover panel 106.

In certain embodiments, there may be additional components not illustrated herein. For example, adhesive may be used between various layers within mechanical stack 100 or between mechanical stack 100 and display 110. Certain embodiments may include a second substrate and sense electrodes may be attached to the first substrate and drive electrodes may be attached to the second substrate.

Figure 3:
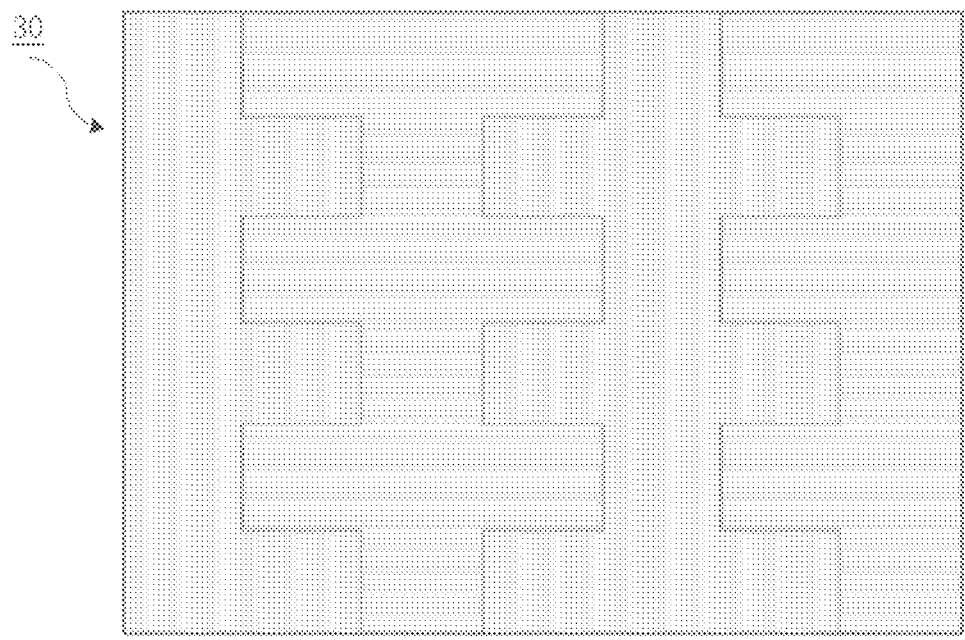
FIG. 3 illustrates an arrangement of sense or drive electrodes in accordance with a conventional approach.

FIG. 3 illustrates an arrangement of drive or sense electrodes in accordance with a conventional approach. As shown in FIG. 3, a section of an electrode layer 30 (either a drive electrode layer or a sense electrode layer) that could be used in touch sensor 10 as illustrated in FIG. 1 includes electrodes arranged in parallel and interdigitated alongside with one another.

In this conventional arrangement, two adjacent electrodes are interdigitated with one another by the means of respective comb-like arms extending therefrom only in one direction transverse to them. However, the teaching of the present disclosure recognize that significantly improved accuracy performance of touch sensor 10 could be achieved by providing those arms with additional interpolation elements such as digits further extending therefrom parallel to the longitudinal direction of the electrode.

Figure 4:
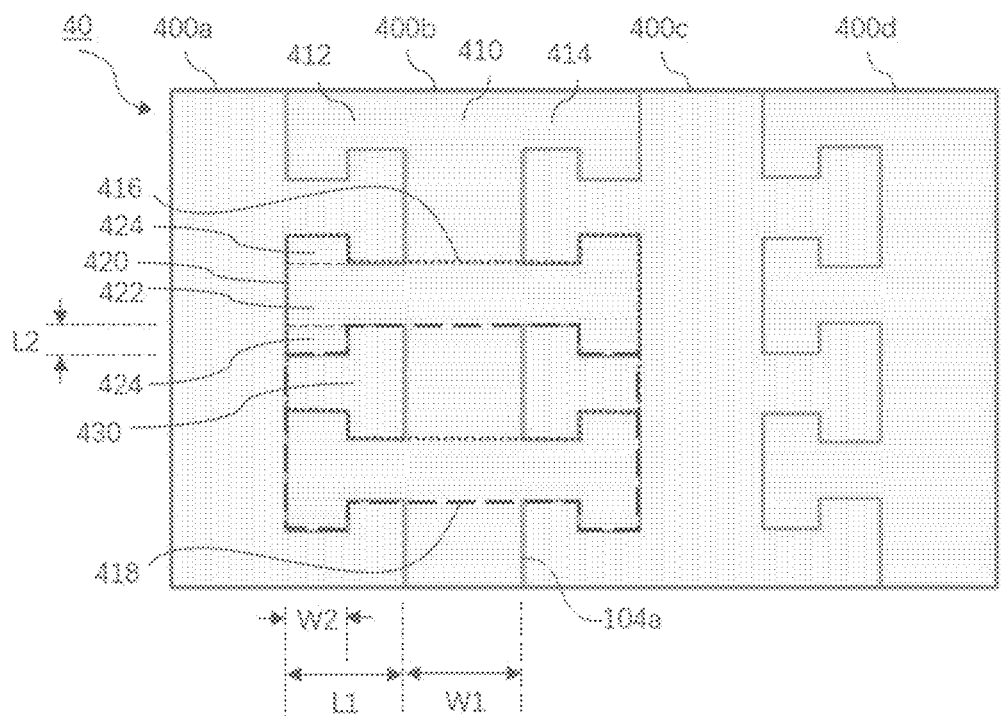
FIG. 4 illustrate an arrangement of sense or drive electrodes in accordance with particular embodiments of the disclosure.

FIG. 4 illustrates an arrangement of either drive electrodes 102 or sense electrodes 103 in accordance with particular embodiments of the disclosure. FIG. 4 illustrates a section of an electrode layer 40 with a particular pattern of electrodes that could be used in touch sensor 10 as illustrated in FIG. 1. As shown in FIG. 4, the electrode layer 40 includes four electrodes 400a, 400b, 400c, and 400d arranged substantially in parallel. However, four electrodes is shown by way of illustration only, and the number of the electrodes arranged in the electrode layer 40 may be any integer greater than one. For the sake of convenience in description below, two adjacent electrodes 400b and 400c located relatively centrally will be referred to as center electrodes, and two electrodes 400a and 400d respectively located near opposite edges of the electrode layer 40 will be referred to as edge electrodes.

Center electrode 400b includes a center region 410 and two side regions 412 and 414. The center region 410 extends in the longitudinal direction of the center electrode 400b. In particular embodiments, the center region 410 has a substantially rectangular shape. The two side regions 412 and 414 are respectively arranged along two opposite sides (e.g., long sides) of center region 410. Both side regions 412 and 414 run substantially parallel to each other and center region 410.

Figure 5:
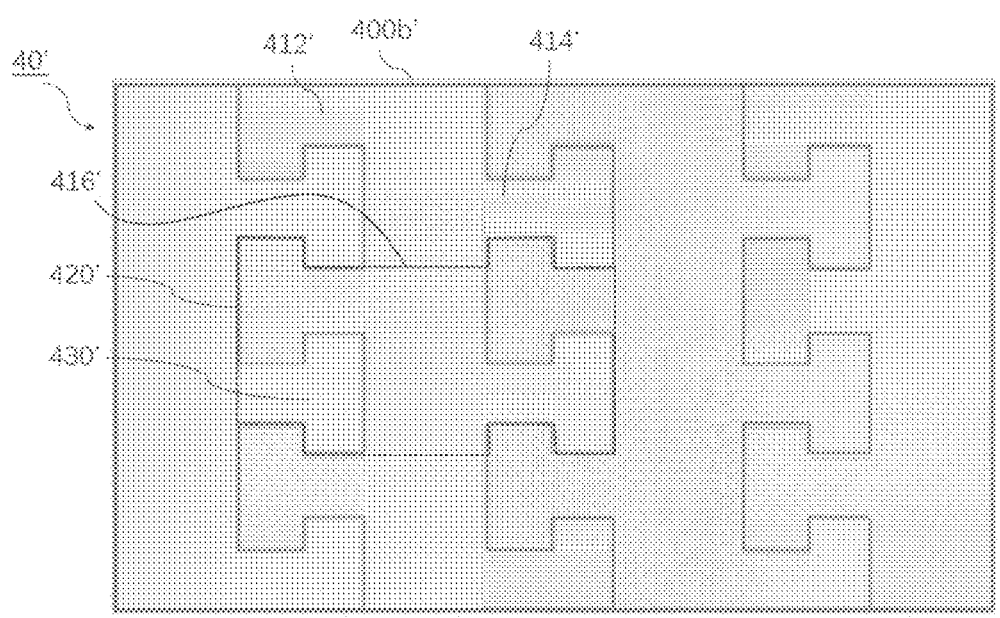
FIG. 5 illustrate an arrangement of sense or drive electrodes in accordance with alternative particular embodiments of the disclosure.

As shown in FIG. 4, each side region 412 and 414 includes three arms 420 respectively extending from the center region 410. It could be understood that for each side region 412 and 414, three arms 420 is shown by way of illustration only, and is not limiting. In certain embodiments, the number of arms 420 of each side region 412 and 414 may be any integer greater than one. Each arm 420 is separated from an adjacent arm 420 in side regions 412 and 414, respectively, by a space 430. The shape of the center electrode 400b includes repeated shape elements 416. In particular embodiments, each shape element 416 has one arm 420 and one space 430 which are substantially point-symmetrical, in each side region 412 and 414. The boundary of a single shape element 416 is illustrated by dashed lines in FIG. 4. In certain embodiments, the center electrode 400b may be formed by repeating shape elements 418, which are opposite handed compared to shape elements 416. As shown in FIG. 4, arms 420 in the side regions 412 and 414 are formed such that two arms 420 of side regions 412 and 414 in each shape element 416 are substantially line-symmetrical (e.g., with respect to the center region 410). In alternative embodiments, arms 420' in the side regions 412' and 414' may be formed in an alternating fashion such that in each shape element 416', two arms 420' of side region 412', 414' are substantially point-symmetrical, as shown in FIG. 5.

As shown in FIG. 4, each arm 420 includes a main portion 422 and two digits 424. The main portion 422 extends with a length L1 from the center region 410 substantially perpendicular to the longitudinal direction of the center electrode 400b. In particular embodiments, a length of each arm 420, i.e., the length L1 is approximately equal to a width W1 of center region 410 of the center electrode 400b. As shown in FIG. 4, the main portion 422 has a substantially rectangular shape, which is, however, shown by way of illustration only. In certain embodiments, the main portion 422 has curved edges, or has any other suitable shape such as a triangle, a trapezoid, etc., where appropriate. The two digits 424 extend respectively from opposite sides of the main portion 422 substantially parallel to the longitudinal direction of the center electrode 400b. In certain embodiments, the two digits 424 are substantially in a same line and have substantially the same widths W2. In particular embodiments, the width W2 is substantially equal to but not greater than one-half of a length L1 of the main portion 422, which would be desirable to enable each arm 420 of the center electrode 400b to fit a corresponding space of the adjacent electrode 400a or 400c in a substantially matching manner (e.g., without each digit 424 overlapping with a corresponding digit of the adjacent electrode 400a or 400c) in the case that the corresponding side region of the adjacent electrode 400a or 400c is formed similarly to the side region 412 or 414 (e.g., to have repeated arms and spaces with similar shape and dimension to that in the side region 412 or 414). As shown in FIG. 4, the two digits 424 extend respectively with substantially the same lengths L2 from the main portion 422, which is, however, shown by way of illustration only. In certain embodiments, the two digits 424 may have different lengths. As shown in FIG. 4, each digit 424 extends from the end portion, away from the center region 410, of the main portion 422, which is, however, shown by way of illustration only. In certain embodiments, each digit 424 may extend from any position on the main portion 422 other than two longitudinal end portions thereof. As shown in FIG. 4, each digit 424 has a substantially rectangular shape, which is, however, shown by way of illustration only. In certain embodiments, each digit 424 has curved edges, or has any other suitable shape such as a triangle, a trapezoid, etc., where appropriate. In alternative embodiments, there may be only one digit 424 provided.

The center electrode 400c has a shape similar to the electrode 400b with similar dimensions. In this embodiment, the center electrodes 400b and 400c are arranged symmetrically.

As shown in FIG. 4, the edge electrodes 400a and 400d are on the left and right hand sides of the electrode layer 40 and each of them includes only one side region 412 or 414. Each edge electrode 400a or 400d also has similar shape and similar dimensions to the central electrode 400b or 400c at least in one side region 412 or 414. In certain embodiments, the edge electrodes 400a and 400d may have any suitable center region width to ensure edge and corner capacitive nodes have approximately equal areas to center nodes. In alternative embodiments, either or both of the edge electrodes 400a and 400d may have two side regions 412 and 414 as the central electrodes 400b and 400c.

Arms 420 in side region 414 of the electrode 400b are interdigitated with arms of the electrode 400c, with the digits 424 of arms 420 further interpolated in spaces of the electrode 400c, such that space 430 between the arms 420 in side region 414 is substantially filled by the arms of the electrode 400c. Interdigitated electrodes 400b and 400c are electrically isolated from each other by one of a plurality of gaps 104a, where each gap 104a is a cut in the lines of conductive material, such as copper, that comprise electrodes 400a to 400d. Arms 420 in side region 412 of electrode 400b are interpolated with arms of electrode 400a, with the digits 424 of arms 420 further interpolated in spaces of the electrode 400a, such that space 430 between the arms 420 in side region 412 is substantially filled by the arms of electrode 400a. Interdigitated electrodes 400b and 400a are electrically isolated from each other by another gap 104a. The patterns of side regions of adjacent electrodes may be complimentary in this way, such that the approximately 100% of the area of space regions may be covered by adjacent electrodes, except in the area of gaps 104a. In certain embodiments, touch sensor 10 may include any suitable number of drive or sense electrodes for its shape and size. Electrodes in various embodiments may be any suitable length and width and the length and/or width of the electrodes within a particular touch sensor may vary.

Technical advantages may include an improvement in the uniformity of sensitivity across touch sensor 10. Further advantages may additionally or alternatively include increased signal size from all the capacitive nodes.

The exemplary technologies discussed in the detailed description above may provide a touch panel having one or more properties of thinness, shielding of the panel by the drive electrodes from electric field noise, high transparency and low manufacturing cost.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An electrode for a touch panel, the electrode being interdigitatable alongside with one or two adjacent electrodes in an electrode array for touch sensing in the touch panel, wherein the electrode comprises:
    a center region extending in a longitudinal direction of the electrode; and
    at least one side region arranged respectively along at least one of two opposite sides of the center region, each of the at least one side region comprising a plurality of arms extending respectively from the center region, the plurality of arms being separated from one another respectively by a plurality of spaces,
    wherein the electrode is shaped to have repeated shape element, the repeated shape element having, in each of the at least one side region, one or more of the plurality of arms and one or more of the plurality of spaces, each of at least one arm among the one or more of the plurality of arms comprising:
    a main portion extending from the center region substantially perpendicular to the longitudinal direction; and
    at least one digit extending respectively from at least one of two opposite sides of the main portion substantially parallel to the longitudinal direction,
    wherein in each of the at least one side region, the one or more of the plurality of arms as a whole are substantially point-symmetrical to the one or more of the plurality of spaces as a whole.

2. The electrode for a touch panel as claimed in claim 1, wherein the one or more of the plurality of arms and the one or more of the plurality of spaces are the same in quantity.

3. The electrode for a touch panel as claimed in claim 1, wherein each of the at least one digit has a first width, substantially perpendicular to the longitudinal direction, that is not greater than one-half of a first length, substantially perpendicular to the longitudinal direction, of the main portion.

4. The electrode for a touch panel as claimed in claim 3, wherein the first width is substantially equal to one-half of the first length.

5. The electrode for a touch panel as claimed in claim 1, wherein the at least one digit extends respectively from at least one of two end portions of the two opposite sides of the main portion, the two end portions being away from the center region respectively on the two opposite sides of the main portion.

6. The electrode for a touch panel as claimed in claim 1, wherein each of at least one arm among the one or more of the plurality of arms comprises two digits extending respectively from the two opposite sides of the main portion.

7. The electrode for a touch panel as claimed in claim 6, wherein the two digits extend to be substantially aligned to each other and substantially parallel to the longitudinal direction.

8. The electrode for a touch panel as claimed in claim 6, wherein the two digits have substantially same widths substantially perpendicular to the longitudinal direction.

9. The electrode for a touch panel as claimed in claim 6, wherein the two digits have substantially same lengths substantially parallel to the longitudinal direction.

10. The electrode for a touch panel as claimed in claim 1, wherein the at least one side region is two side regions, and the one or more of the plurality of arms as a whole in one of the two side regions are substantially line-symmetrical or point-symmetrical to the one or more of the plurality of arms as a whole in the other of the two side regions.

11. The electrode for a touch panel as claimed in claim 1, wherein the main portion has a first length, substantially perpendicular to the longitudinal direction, substantially equal to a second width, substantially perpendicular to the longitudinal direction, of the center region.

12. A touch panel comprising:
    at least one substrate; and
    one or more arrays of electrodes disposed on the at least one substrate to form a plurality of capacitive nodes for touch sensing,
    wherein each of at least one array among the one or more arrays of electrodes comprises a plurality of electrodes interdigitated alongside with one another in a substantially matching manner, each of the plurality of electrodes is an electrode as claimed in claim 1.

13. The touch panel as claimed in claim 12, wherein the plurality of electrodes comprises:
    at least one center electrode, the at least one side region of each of which is two side regions; and
    two edge electrodes, the at least one side region of each of which is one side region.

14. The touch panel as claimed in claim 13, wherein in each of the at least one side region, the one or more of the plurality of arms as a whole are substantially point-symmetrical to the one or more of the plurality of spaces as a whole, and the one or more of the plurality of arms as a whole in one of the two side regions are substantially line-symmetrical or point-symmetrical to the one or more of the plurality of arms as a whole in the other of the two side regions.

15. A terminal device comprising a touch panel as claimed in claim 12.

* * * * *